US012517583B2

United States Patent
(12) Fujita

(10) Patent No.: US 12,517,583 B2
(45) **Date of Patent: *Jan. 6, 2026**

(54) INFORMATION PROCESSING SYSTEM AND INFORMATION PROCESSING METHOD

(71) Applicant: CANON KABUSHIKI KAISHA, Tokyo (JP)

(72) Inventor: Nao Fujita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/791,547

(22) Filed: Aug. 1, 2024

(65) Prior Publication Data

US 2024/0393877 A1 Nov. 28, 2024

Related U.S. Application Data

(63) Continuation of application No. 18/473,413, filed on Sep. 25, 2023, now Pat. No. 12,197,647.

(30) Foreign Application Priority Data

Oct. 11, 2022 (JP) ................................ 2022-163334

(51) Int. Cl.
*G06F 3/01* (2006.01)
*G06F 3/03* (2006.01)
(Continued)

(52) U.S. Cl.
CPC ............ *G06F 3/014* (2013.01); *G06F 3/0304* (2013.01); *G06F 3/0346* (2013.01); (Continued)

(58) Field of Classification Search
None
See application file for complete search history.

(56) References Cited

U.S. PATENT DOCUMENTS

2021/0004146 A1 1/2021 Linville
2021/0208698 A1* 7/2021 Martin .................... G06F 3/012
(Continued)

FOREIGN PATENT DOCUMENTS

JP 2013172432 A 9/2013
JP 2017004457 A 1/2017
(Continued)

*Primary Examiner* — Joseph R Haley
(74) *Attorney, Agent, or Firm* — Carter, DeLuca & Farrell LLP

(57) ABSTRACT

An information processing system determines motion of a hand of a user on the basis of inertial information of a controller held in or mounted on the hand. The information processing system controls a display unit to display a virtual space in which a virtual interface is placed in a real space. The information processing system determines, on the basis of an image-captured image in which the hand is image-captured, whether or not a position of the virtual interface and a position of the hand are in a particular relation. In a case in which the position of the virtual interface and the position of the hand are determined to be in the particular relation in the virtual space, the information processing system changes the display of the virtual interface on the basis of the motion of the hand.

12 Claims, 13 Drawing Sheets

START
DISPLAY DIAL S501
DETERMINE OPERATION ACCEPTING RANGE S502
FINGER TOUCHED DIAL? S503 NO
YES
DETERMINE INITIAL POSITION OF FINGER S504
DETERMINE CURRENT POSITION OF FINGER S505
HAND INCLUDED IN IMAGE-CAPTURED IMAGE? S506 NO
YES
CALCULATE SHIFT INFORMATION S507
RESET INITIAL POSITION, ETC. S508
DETERMINE ACTION ANGLE S509
OPERATE DIAL S510
FINGER MOVED AWAY FROM DIAL? S511 NO
YES
END DISPLAY OF DIAL S512
END

(51) Int. Cl.

| | |
|---|---|
| ***G06F 3/0346*** | (2013.01) |
| ***G06F 3/04815*** | (2022.01) |
| ***G06F 3/04845*** | (2022.01) |
| ***G06F 3/0487*** | (2013.01) |
| ***G06T 19/00*** | (2011.01) |

(52) U.S. Cl.
CPC ...... *G06F 3/04815* (2013.01); *G06F 3/04845* (2013.01); *G06F 3/0487* (2013.01); *G06T 19/006* (2013.01); *G06F 2203/0331* (2013.01)

(56) References Cited

U.S. PATENT DOCUMENTS

| | | | | |
|---|---|---|---|---|
| 2023/0333650 | A1 | 10/2023 | Hylak | |
| 2024/0118751 | A1 | 4/2024 | Fujita | |
| 2024/0281065 | A1 * | 8/2024 | Hafeneger | ......... G06K 7/10297 |

FOREIGN PATENT DOCUMENTS

| | | | |
|---|---|---|---|
| JP | 2017174363 | A | 9/2017 |
| JP | 2018206340 | A | 12/2018 |
| JP | 2020129167 | A | 8/2020 |

* cited by examiner 1
100
110
120

100
201
HMD CONTROL UNIT
202
IMAGE-CAPTURING UNIT
203
IMAGE DISPLAY UNIT
204
ATTITUDE SENSOR UNIT
110
211
CONTROL UNIT
212
CONTENTS DATABASE
213
COMMUNICATION UNIT
120
221
CONTROLLER CONTROL UNIT
222
DETECTING UNIT
223
COMMUNICATION UNIT

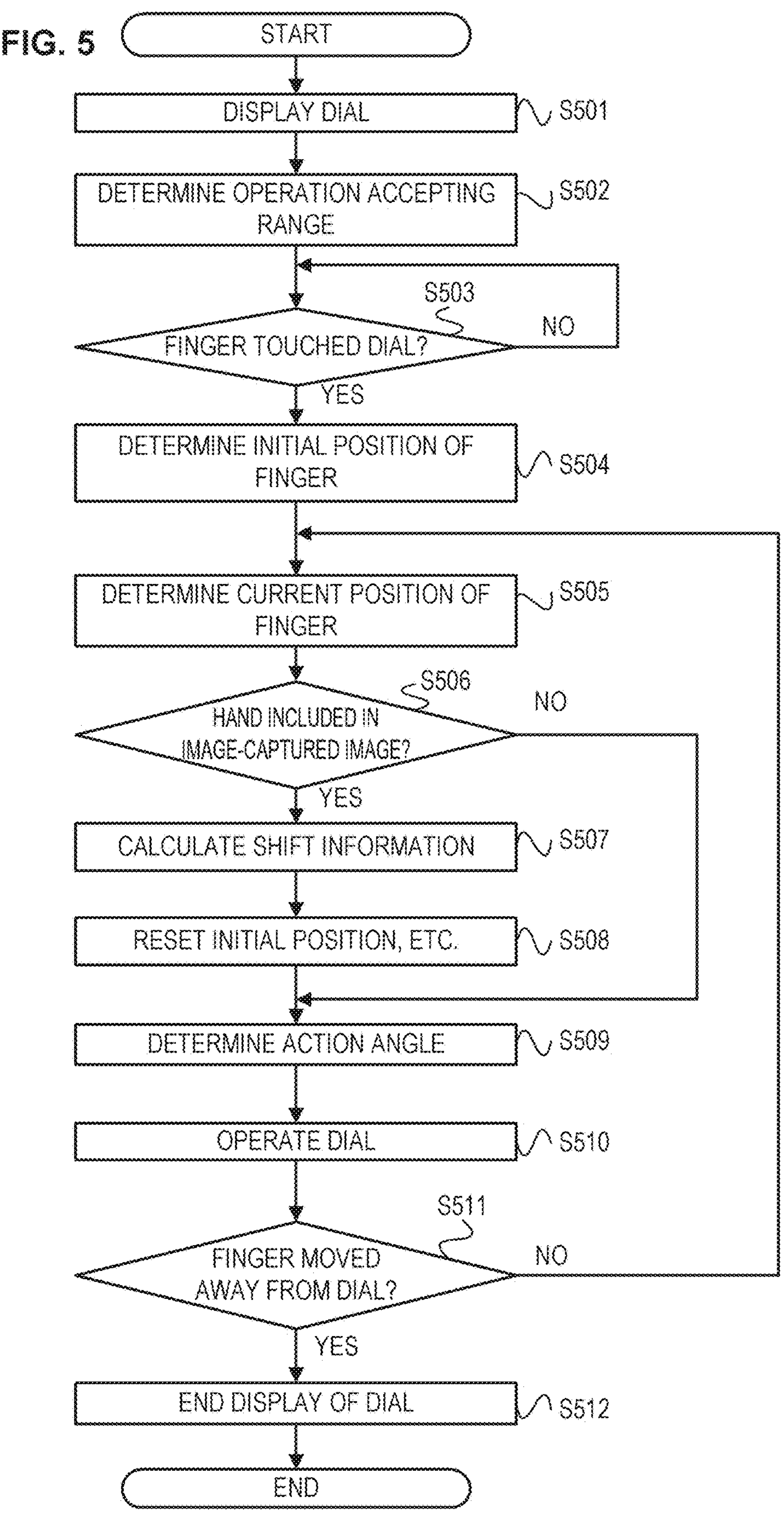
FIG. 5
START
DISPLAY DIAL
S501
DETERMINE OPERATION ACCEPTING RANGE
S502
S503
FINGER TOUCHED DIAL?
NO
YES
DETERMINE INITIAL POSITION OF FINGER
S504
DETERMINE CURRENT POSITION OF FINGER
S505
S506
HAND INCLUDED IN IMAGE-CAPTURED IMAGE?
NO
YES
CALCULATE SHIFT INFORMATION
S507
RESET INITIAL POSITION, ETC.
S508
DETERMINE ACTION ANGLE
S509
OPERATE DIAL
S510
S511
FINGER MOVED AWAY FROM DIAL?
NO
YES
END DISPLAY OF DIAL
S512
END 301
310
(x(0), y(0), z(0))
120

301
310
L(t)
(x(0), y(0), z(0))
(x(t), y(t), z(t))
120

START
DISPLAY SLIDER
S901
SET OPERATION ACCEPTING RANGE
S902
S903
FINGER TOUCHED SLIDER?
NO
YES
DETERMINE INITIAL POSITION OF CONTROLLER
S904
DETERMINE CURRENT POSITION OF CONTROLLER
S905
DETERMINE ACTION DISTANCE
S906
OPERATE SLIDER
S907
S908
FINGER MOVED AWAY FROM SLIDER?
NO
YES
END DISPLAY OF SLIDER
S909
END

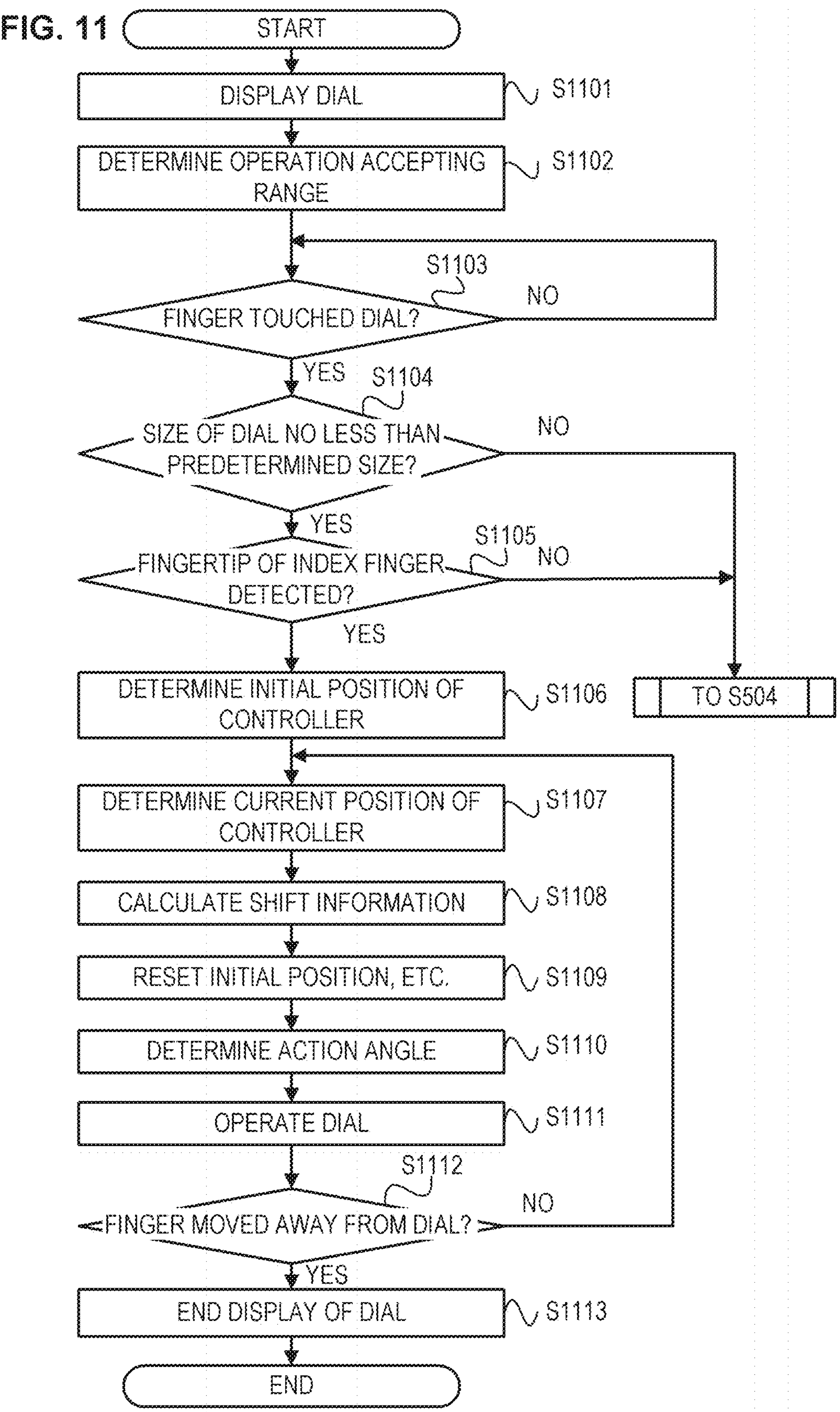
FIG. 11
START
DISPLAY DIAL
S1101
DETERMINE OPERATION ACCEPTING RANGE
S1102
S1103
NO
FINGER TOUCHED DIAL?
YES
S1104
SIZE OF DIAL NO LESS THAN PREDETERMINED SIZE?
NO
YES
S1105
NO
FINGERTIP OF INDEX FINGER DETECTED?
YES
DETERMINE INITIAL POSITION OF CONTROLLER
S1106
TO S504
DETERMINE CURRENT POSITION OF CONTROLLER
S1107
CALCULATE SHIFT INFORMATION
S1108
RESET INITIAL POSITION, ETC.
S1109
DETERMINE ACTION ANGLE
S1110
OPERATE DIAL
S1111
S1112
NO
FINGER MOVED AWAY FROM DIAL?
YES
END DISPLAY OF DIAL
S1113
END INITIAL POSITION
θ(t)
θ(t)
120
300

INITIAL POSITION
120
300

START
DISPLAY DIAL
S1301
DETERMINE OPERATION ACCEPTING RANGE
S1302
S1303
FINGER TOUCHED DIAL?
NO
YES
DETERMINE INITIAL POSITION OF FINGER
S1304
DETERMINE ACTION ANGLE
S1305
OPERATE DIAL
S1306
S1307
FINGER MOVED AWAY FROM DIAL?
NO
YES
END DISPLAY OF DIAL
S1308
END

INFORMATION PROCESSING SYSTEM AND INFORMATION PROCESSING METHOD

CROSS REFERENCE TO RELATED APPLICATIONS

This application is a continuation of U.S. patent application Ser. No. 18/473,413, filed on Sep. 25, 2023, which claims the benefit of and priority to Japanese Patent Application No. 2022-163334, filed Oct. 11, 2022, each of which is hereby incorporated by reference herein in their entirety.

BACKGROUND OF THE INVENTION

Field of the Invention

The present invention relates to an information processing system and an information processing method.

Description of the Related Art

Conventionally, technology has been studied in mixed reality (MR) technology and in virtual space (virtual reality (VR)) technology, in which users operate computer graphics (CG) models. In such technology, head-mounted displays (HMDs) that are head-mounted type display devices are often used.

Japanese Patent Application Publication No. 2020-129167 describes a method and the like for moving a CG model by motion capturing using image-captured images in which images of a hand are captured using an image-capturing device, simultaneous localization and mapping (SLAM), and so forth.

Japanese Patent Application Publication No. 2018-206340 describes a method for operating a switch of a CG model by tracking motion of a hand of a user, using image-captured images in which images of a hand are captured using a device installed in an HMD, and so forth.

However, in the above-described technology, there has been a problem in that in cases where the hand is not in the image-captured image, motion of the hand cannot be appropriately detected to operate a virtual interface.

SUMMARY OF THE INVENTION

Accordingly, it is an object of the present invention to provide technology that enables motion of the hand to be detected and a virtual interface to be appropriately operated.

An aspect of the invention is an information processing system including at least one memory and at least one processor which function as: a first determining unit configured to determine motion of a hand of a user on a basis of inertial information of a controller held in or mounted on the hand; a control unit configured to control a display unit to display a virtual space in which a virtual interface is placed in a real space; and a second determining unit configured to determine, on a basis of an image-captured image in which the hand is image-captured, whether or not a position of the virtual interface and a position of the hand are in a particular relation, wherein in a case in which the second determining unit determines that the position of the virtual interface and the position of the hand are in the particular relation in the virtual space, the control unit changes the display of the virtual interface on a basis of the motion of the hand determined by the first determining unit.

An aspect of the invention is an information processing method, including: determining motion of a hand of a user on a basis of inertial information of a controller held in or mounted on the hand; controlling a display unit to display a virtual space in which a virtual interface is placed in a real space; and determining, on a basis of an image-captured image in which the hand is image-captured, whether or not a position of the virtual interface and a position of the hand are in a particular relation, wherein in a case in which it is determined that the position of the virtual interface and the position of the hand are in the particular relation in the virtual space, the display of the virtual interface is changed on a basis of the motion of the hand determined.

Further features of the present invention will become apparent from the following description of exemplary embodiments with reference to the attached drawings.

BRIEF DESCRIPTION OF THE DRAWINGS

FIG. 5 is a flowchart of operation processing of the virtual dial according to the first embodiment;

FIG. 11 is a flowchart of operation processing of a virtual dial according to a second embodiment;

DESCRIPTION OF THE EMBODIMENTS

Embodiments of the present invention will be described in detail below with reference to the attached drawings.

First Embodiment

Figure 1:
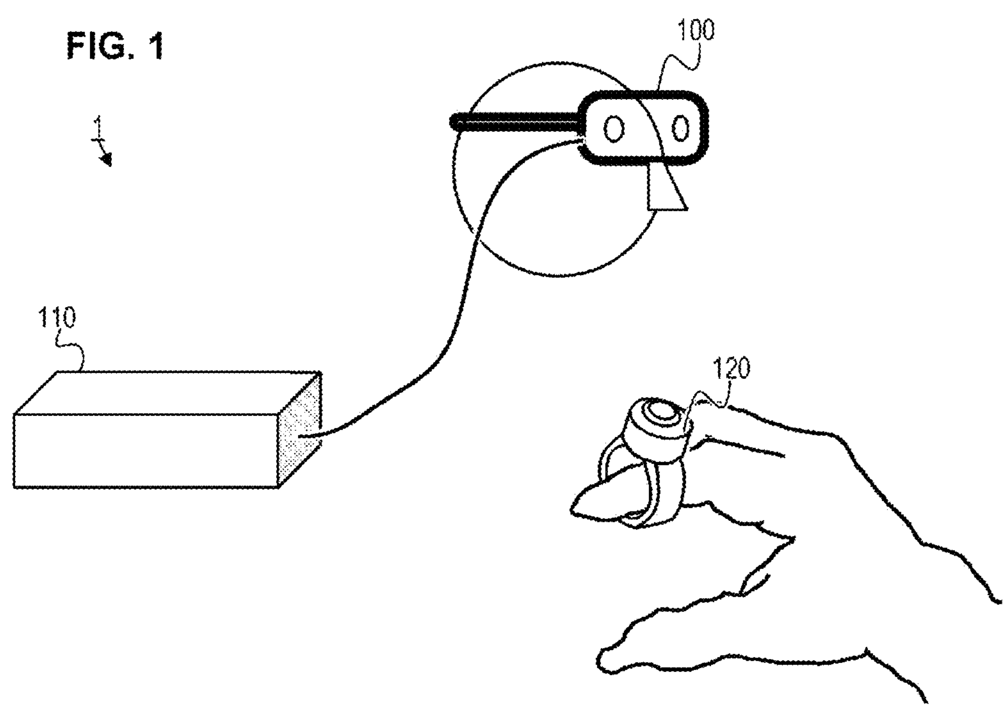
FIG. 1 is an external view of an information processing system 1 according to a first embodiment.

An information processing system 1 according to a first embodiment will be described with reference to FIG. 1. The information processing system 1 has a head-mounted display (HMD) 100, an image processing device 110, and a controller 120.

The HMD 100 is a head-mounted type display device (electronic device) that is mounted on the head of a user. The HMD 100 displays composited images, in which image-captured images where image-capturing is performed of a range in front of the user by the HMD 100, and contents such as computer graphics (CG) and so forth, in a form corresponding to the attitude of the HMD 100, are composited.

The image processing device 110 is a control device (information processing device, electronic device) that controls the HMD 100. The image processing device 110 is, for example, a smartphone, a tablet terminal, or a personal computer (PC). The image processing device 110 is connected to the HMD 100 by wireless or wired communication. The image processing device 110 generates composited images by compositing image-captured images and computer graphics (virtual operating interfaces and so forth), and transmits the composited images to the HMD 100. Note that the configurations of the image processing device 110 may be included in the HMD 100.

The controller 120 is a device for performing various types of control of the HMD 100. The controller 120 accepts user operations performed on a virtual operating interface (virtual dial, virtual slider, or the like) expressed by computer graphics. The shape of the controller 120 is a ring-like shape so as to be mountable on a finger of the user, as illustrated in FIG. 1, for example. Due to the controller 120 being mountable on a finger of the user, the user can freely move his/her hands while holding the controller 120. The controller 120 performs wireless communication with the image processing device 110 by Bluetooth.

Internal Configuration of HMD

Figure 2:
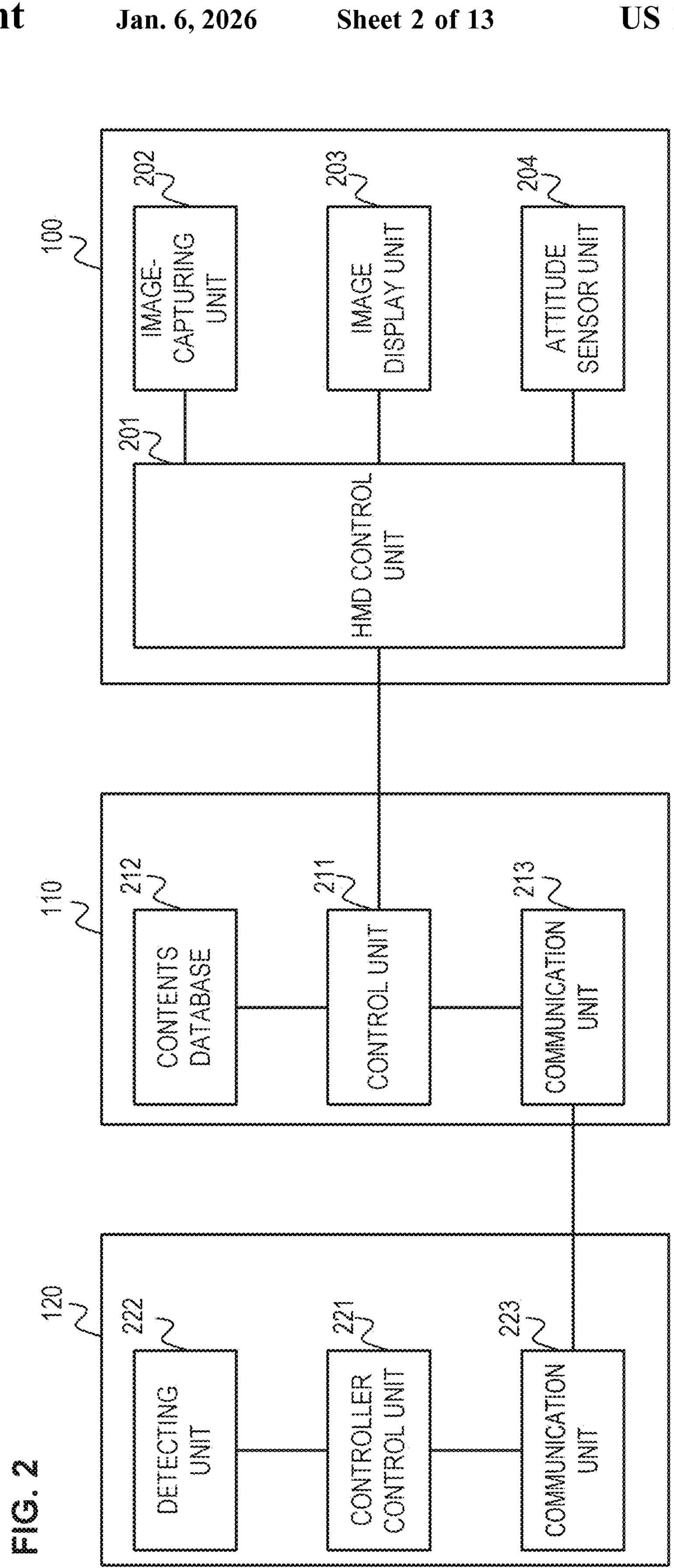
FIG. 2 is a diagram illustrating configurations of the information processing system 1 according to the first embodiment.

An internal configuration of the HMD 100 will be described with reference to FIG. 2. The HMD 100 has an HMD control unit 201, an image-capturing unit 202, an image display unit 203, and an attitude sensor unit 204.

The HMD control unit 201 controls the configurations of the HMD 100. Upon acquiring a composited image (an image in which an image-captured image obtained by the image-capturing unit 202 performing image-capturing of space in front of the user, and computer graphics, are composited) from the image processing device 110, the HMD control unit 201 displays the composited image on the image display unit 203. Accordingly, the user can view the composited image displayed on the image display unit 203 by mounting the HMD 100 thereupon. The user can experience various types of mixed reality (virtual space) in which computer graphics are fused with real space.

The image-capturing unit 202 includes two cameras (image-capturing devices). The two cameras are disposed near the right and left eyes of the user when mounting the HMD 100, in order to perform image-capturing of space the same as the space that the user is normally seeing. Images of subjects (the range in front of the user) image-captured by the two cameras are output to the image processing device 110. Also, the two cameras in the image-capturing unit 202 can acquire information of distance from the two cameras to the subjects as distance information, by stereo camera ranging.

The image display unit 203 displays composited images representing virtual space in which computer graphics are placed in real space. The image display unit 203 has a liquid crystal panel, an organic electroluminescence panel, or the like. In a state in which the user is mounting the HMD 100, an organic electroluminescence panel is disposed in front of each eye of the user.

The attitude sensor unit 204 detects the attitude (and position) of the HMD 100. The attitude sensor unit 204 also detects (acquires) the attitude of the user (user with the HMD 100 mounted), so as to correspond with the attitude (and position) of the HMD 100. The attitude sensor unit 204 has an inertial measurement unit (IMU). The attitude sensor unit 204 outputs information of the attitude of the user (attitude information) to the image processing device 110.

Internal Configuration of Image Processing Device

An internal configuration of the image processing device 110 will be described with reference to FIG. 2. The image processing device 110 has a control unit 211, a contents database 212, and a communication unit 213.

The control unit 211 controls the configurations of the image processing device 110. The control unit 211 can also control the HMD 100 and the controller 120.

The control unit 211 receives an image acquired by the image-capturing unit 202 (image-captured image) and attitude information acquired by the attitude sensor unit 204, from the HMD 100. The control unit 211 subjects the image-captured image to image processing to cancel out aberration in the optical system of the image-capturing unit 202 and the optical system of the image display unit 203. The control unit 211 then composites the image-captured image and optional computer graphics, thereby generating a composited image. That is to say, the control unit 211 generates a composited image representing virtual space in which computer graphics are placed in real space (space represented by the image-captured image). The control unit 211 transmits the composited image to the HMD control unit 201 of the HMD 100.

Note that the control unit 211 can control the position, orientation, and size of the computer graphics in the composited image, on the basis of information acquired by the HMD 100 (distance information and attitude information). For example, in the space represented by the composited image, in a case of placing a virtual object represented by computer graphics nearby a certain object that is present in the real space, the closer the distance between the certain object and the image-capturing unit 202 is, the larger the control unit 211 displays the virtual object (computer graphics). Thus, by controlling the position, orientation, and size of computer graphics, the control unit 211 can generate a composited image in which a computer graphics object that is not present in the real space appears as if it were placed in the real space.

The contents database 212 is a storage unit that stores information regarding computer graphics and so forth. Note that the control unit 211 can switch computer graphics read out from the contents database 212 (i.e., the computer graphics used for generating composited images).

Internal Configuration of Controller

An internal configuration of the controller 120 will be described with reference to FIG. 2. The controller 120 has a controller control unit 221, a detecting unit 222, and a communication unit 223.

The controller control unit 221 controls the configurations of the controller 120.

The detecting unit 222 includes an acceleration sensor (sensor that acquires acceleration information) and/or a gyro sensor (sensor that acquires angular velocity information). The detecting unit 222 acquires inertial information (acceleration information, angular velocity information, and so forth) of the controller 120. The detecting unit 222 can also detect motion of the hand of the user, on the basis of the inertial information. Motion of the hand can be expressed by movement vectors (movement information) and rotational angle of the hand. Note that in the first embodiment, the controller 120 is mounted on the hand, and accordingly the motion of the controller 120 can be said to be the motion of the hand.

The communication unit 223 performs wireless communication with the image processing device 110 (communication unit 213). The communication unit 223 transmits, for example, inertial information of the controller 120, or information of motion of the hand of the user detected from the inertial information, to the image processing device 110.

Note that the image processing device 110 (information processing device) may have part of the configurations of the controller 120 or part of the configurations of the HMD 100. For example, the controller 120 may have just the configuration of the detecting unit 222 for acquiring inertial information, and the image processing device 110 may have a configuration for detecting (determining) motion of the hand from the inertial information.

An example of operation of virtual operating interfaces (virtual interfaces) such as dials, sliders, and so forth, will be described with reference to FIGS. 3 to 6B. An example of operating a virtual dial 300 and a virtual slider 301, for sound volume adjustment, will be described here. The virtual dial 300 is operable in accordance with rotation of the hand (wrist) in an x-y plane, which will be described later. Sound volume is controlled in accordance with operations of the virtual dial 300. The virtual slider 301 is operable in accordance with rotation of the hand on the x-y plane, which will be described later. Sound volume is controlled in accordance with operations of the virtual slider 301. Note that the following description is not limited to the virtual dial 300 and the virtual slider 301, and is applicable to any virtual operating interface that is to be operated in accordance with motion of the hand (e.g., a virtual lever or the like).

Figure 3:
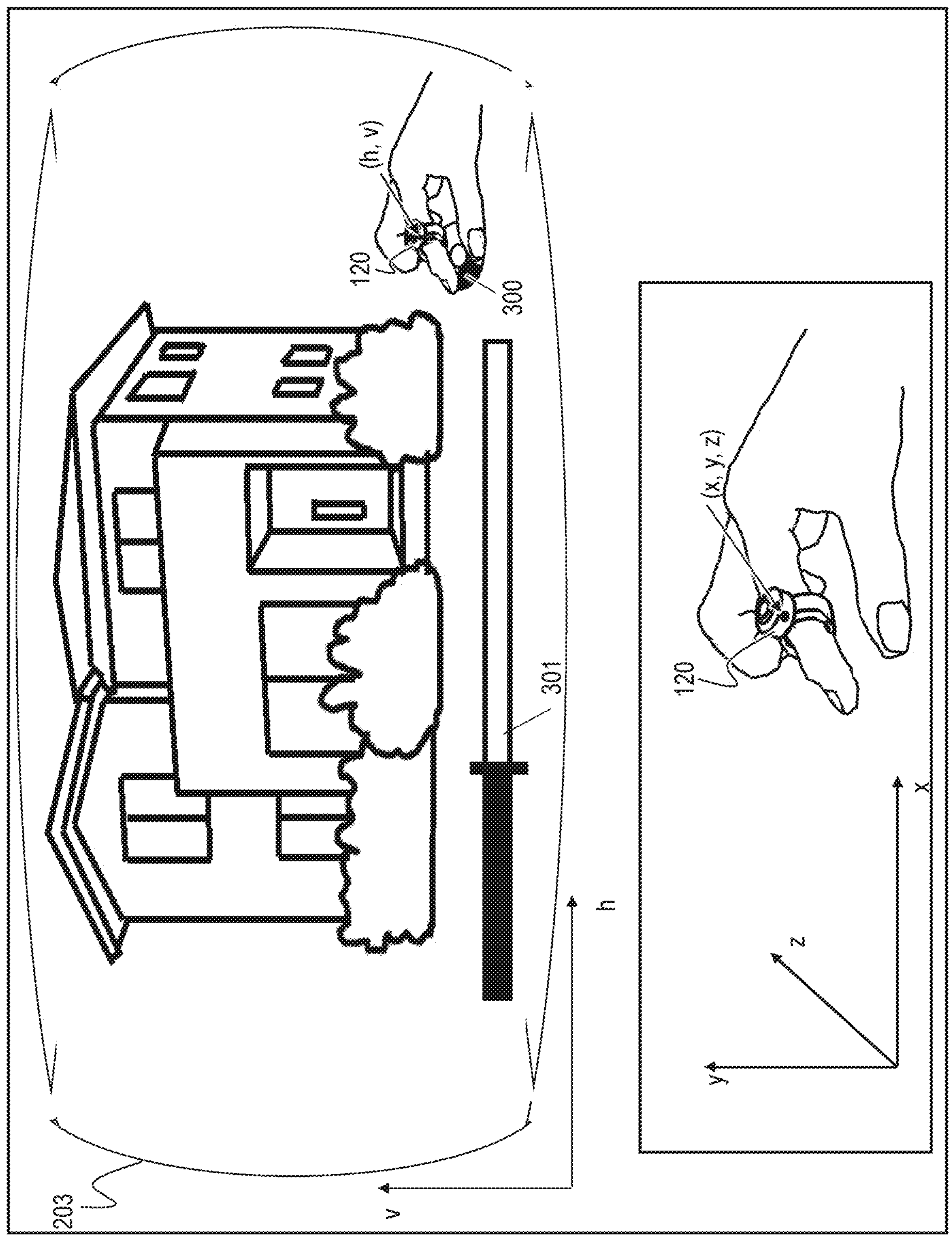
FIG. 3 is a diagram illustrating a relation between real space and a composited image according to the first embodiment.

FIG. 3 illustrates a relation between real space and a composited image displayed on the image display unit 203. Here, a coordinate system of the real space is expressed by coordinates (x, y, z), and a coordinate system of the image-captured image (two-dimensional image) acquired by the image-capturing unit 202 in the HMD 100 is expressed by coordinates (h, v). In the composited image, the virtual dial 300 for sound volume adjustment and the virtual slider 301 for sound volume adjustment are superimposed on an image-captured image (image of real space) of a house and the hand of the user, image-captured by the image-capturing unit 202.

Operation of Virtual Dial

Figure 4B:
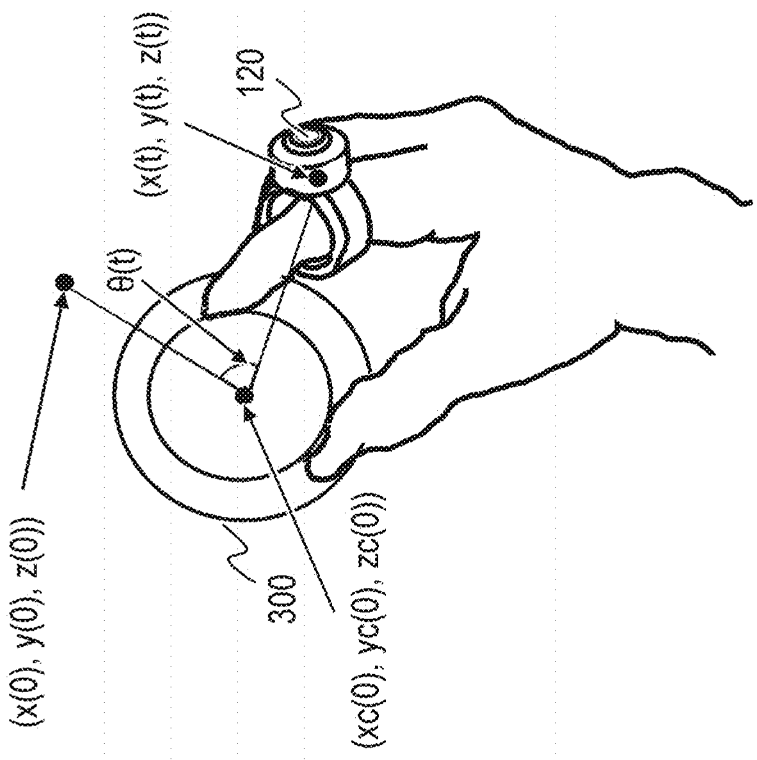
FIGS. 4A and 4B are diagrams for describing operations of a virtual dial according to the first embodiment.

Operation of the virtual dial 300 will be described with reference to FIGS. 4A to 5. Hereinafter, the coordinates of the position of the controller 120 in real space at time t will be expressed as coordinates (x(t), y(t), z(t)).

In the following, the control unit 211 operates the virtual dial 300 by changing (updating) display of the virtual dial 300 on the basis of information of the position of the hand of the user that is obtained from the image-captured image acquired by the image-capturing unit 202 in the HMD 100, and information of the motion of the hand of the user that is obtained from the detecting unit 222 of the controller 120.

First, the flow of operations of the virtual dial 300 will be described with reference to the flowchart in FIG. 5. The processing of the flowchart of FIG. 5 is started in a case in which the user selects an item for sound volume adjustment from a menu.

In step S501, the control unit 211 displays the virtual dial 300 on the image display unit 203 of the HMD 100. That is to say, the control unit 211 displays a composited image, representing virtual space in which the virtual dial 300 is placed in real space, on the image display unit 203. At this time, the control unit 211 acquires coordinates (xc(0), yc(0), zc(0)) of a center position of the virtual dial 300 in the real space, as illustrated in FIG. 4A.

Figure 6A:
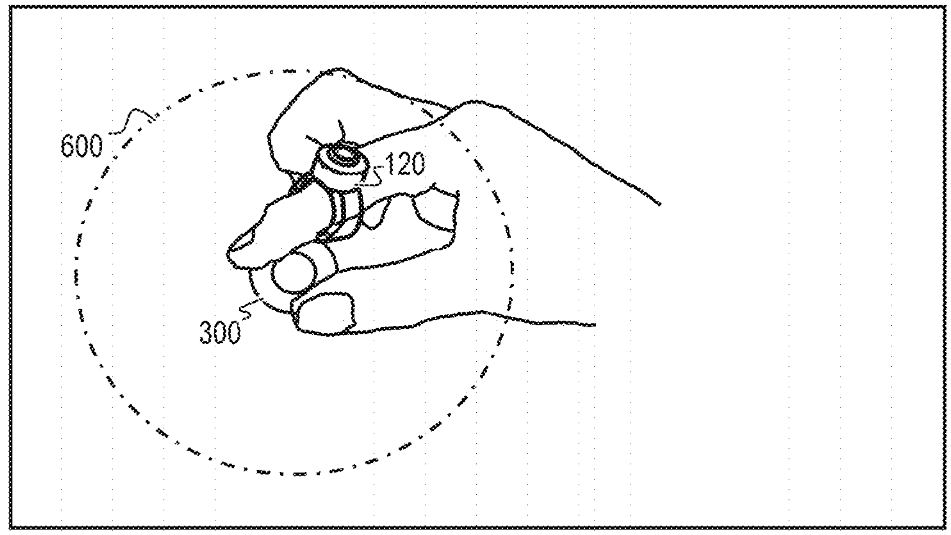
FIGS. 6A and 6B are diagrams for describing an operation-accepting range according to the first embodiment.

In step S502, the control unit 211 sets an operation accepting range 600 of the virtual dial 300 in real space, as illustrated in FIG. 6A. For example, the control unit 211 sets a sphere (circle) having a particular radius, of which the coordinates (xc(0), yc(0), zc(0)) of the center position of the virtual dial 300 is the center. The control unit 211 then sets the range included in this sphere (circle) as being the operation accepting range 600.

Figure 6B:
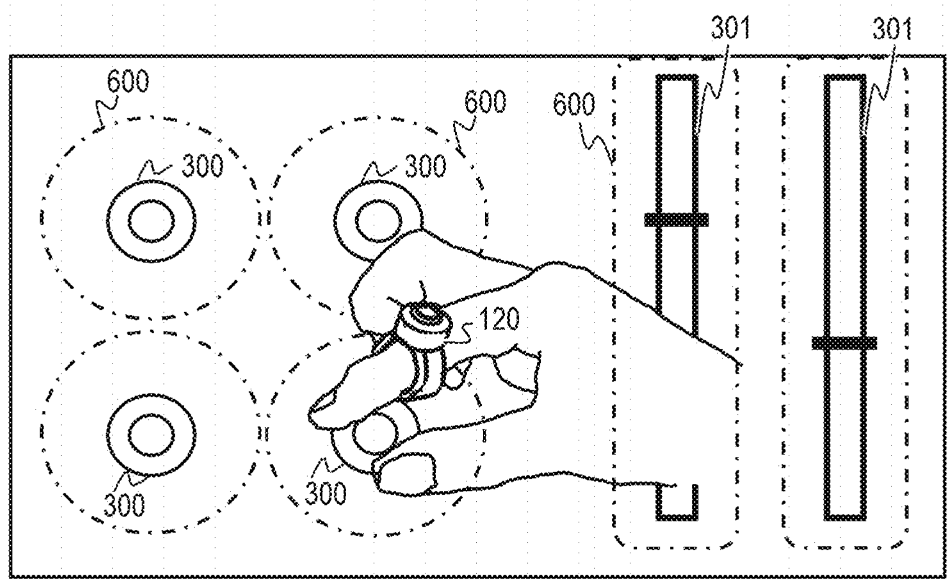

Note that in a case in which a plurality of the virtual operating interfaces are present in the surroundings of one virtual dial 300, as illustrated in FIG. 6B, the control unit 211 determines whether or not the distance between the virtual dial 300 and the other virtual operating interfaces is closer than a particular distance. In a case in which the distance between the virtual dial 300 and the other virtual operating interfaces is closer than the particular distance, the control unit 211 narrows the operation accepting range 600 of this virtual dial 300. Thus, the risk of a plurality of operation accepting ranges 600 overlapping each other can be reduced by narrowing the operation accepting ranges 600, even in a case in which the distance among the plurality of virtual operating interfaces is short. Thus, switching objects of operation among the plurality of virtual operating interfaces can be smoothly performed.

In step S503, the control unit 211 determines whether or not the finger of the user has touched the virtual dial 300, on the basis of the image-captured image. At this time, the control unit 211 first converts the coordinates (h, v) of the position of the finger (controller 120) in the image-captured image into the coordinates (x, y, z) of the real space. Thereafter, the control unit 211 determines whether or not the finger has touched the virtual dial 300 in accordance with whether or not the coordinates (x, y, z) are included in the operation accepting range 600. Thus, erroneous detection of whether or not the virtual dial 300 has been touched can be prevented. Note that the distance information acquired by the image-capturing unit 202 is also preferably used in the conversion from the coordinates (h, v) into the coordinates (x, y, z), for example. Also, whether or not the finger has touched the virtual dial 300 may be determined in accordance with whether or not the distance between the coordinates of the finger and the coordinates of the center position of the virtual dial 300 is shorter than a predetermined distance.

In a case in which determination is made in step S503 that the finger of the user has touched the virtual dial 300 (in a case in which the position of the finger is determined to be included in the operation accepting range 600), the flow advances to step S504. In a case in which determination is made that the finger of the user has not touched the virtual dial 300 (in a case in which the position of the finger is determined to not be included in the operation accepting range 600), the processing of step S503 is repeated.

In step S504, the control unit 211 determines coordinates (x(0), y(0), z(0)) of the initial position of the controller 120 (the finger on which the controller 120 is mounted), and coordinates (xt(0), yt(0), zt(0)) of the initial position of the thumb, on the basis of the image-captured image. In step S504, the initial position is the position at the point in time when time t=0 at which determination is made that the finger touched the virtual dial 300. Further, the control unit 211 calculates a distance L between the center position of the virtual dial 300 and the controller 120 on the x-y plane, by the following Expression 1 (see FIG. 4A).

[Math. 1]

$$L = \sqrt{(x(0)-xc(0))^2 + (y(0)-yc(0))^2} \quad (1)$$

Figure 4A:
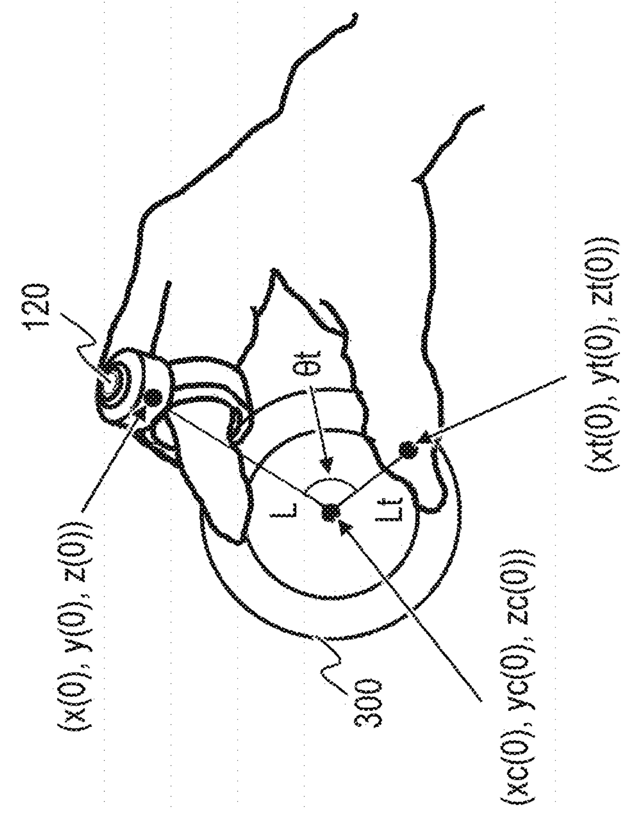

Also, the control unit 211 calculates a distance Lt between the thumb and the center position of the virtual dial 300 on the x-y plane by the following Expression 2 (see FIG. 4A).

[Math. 2]

$$Lt = \sqrt{(xt(0)-xc(0))^2 + (yt(0)-yc(0))^2} \tag{2}$$

The control unit 211 then calculates an angle θt formed between a line segment connecting the center position of the virtual dial 300 and the position of the thumb, and a line segment connecting the position of the controller 120 and the center position of the virtual dial 300, by the following Expression 3 (see FIG. 4A).

[Math. 3]

$$\theta t = \cos^{-1}\frac{(x(0)-xc(0))(y(0)-yc(0))}{\sqrt{(x(0)-xc(0))^2 + (y(0)-yc(0))^2}\sqrt{(xt(0)-xc(0))^2 + (yt(0)-yc(0))^2}} \tag{3}$$

In step S505, the control unit 211 determines the current position of the controller 120 (the finger on which the controller 120 is mounted). The control unit 211 determines coordinates (x(t), y(t), z(t)) of the current position of the controller 120 on the basis of acceleration information (ax(t), ay(t), az(t)) of the controller 120. Note that in a case in which the image-capturing unit 202 is performing image-capturing of the finger, the control unit 211 may determine, in addition to the acceleration information, the coordinates (x(t), y(t), z(t)) on the basis of the coordinates (h(t), v(t)) of the position of the controller 120 obtained from the image-captured image.

First, the control unit 211 controls the detecting unit 222 to detect (determine) motion of the hand. Specifically, the detecting unit 222 calculates (detects) movement information (Δx(t), Δy(t), Δz(t)) from the coordinates (x(0), y(0), z(0)) of the initial position of the controller 120, as information representing motion of the hand.

In order to calculate the movement information (Δx(t), Δy(t), Δz(t)), the detecting unit 222 performs double integration of the detected acceleration. For example, the detecting unit 222 can calculate the movement information Δx(t) of movement in the x-axis direction from time t=0 to time t=T using acceleration ax(t) in an x-axis direction, by the following Expression 4. Note that such calculation as shown in Expression 4 is performed regarding each of the x-axis direction, a y-axis direction, and a z-axis direction.

[Math. 4]

$$\Delta x(t) = \sum_{t=0}^{T}\sum_{t=0}^{T} ax(t)dtdt \tag{4}$$

The control unit 211 then determines coordinates obtained by adding the movement information (Δx(t), Δy(t), Δz(t)) to the coordinates (x(0), y(0), z(0)) of the initial position to be the coordinates (x(t), y(t), z(t)) of the current position of the controller 120. Calculating the current position in accordance with the movement information enables the virtual dial 300 to be appropriately operated even in cases in which the finger (controller 120) cannot be detected in the image-captured image obtained from the image-capturing unit 202.

In step S506, the control unit 211 determines whether or not the hand is included in the image-captured image acquired by the image-capturing unit 202. In a case in which determination is made that the hand is included in the image-captured image, the flow advances to step S507. In a case in which determination is made that the hand is not included in the image-captured image, the flow advances to step S509.

Figure 7A:
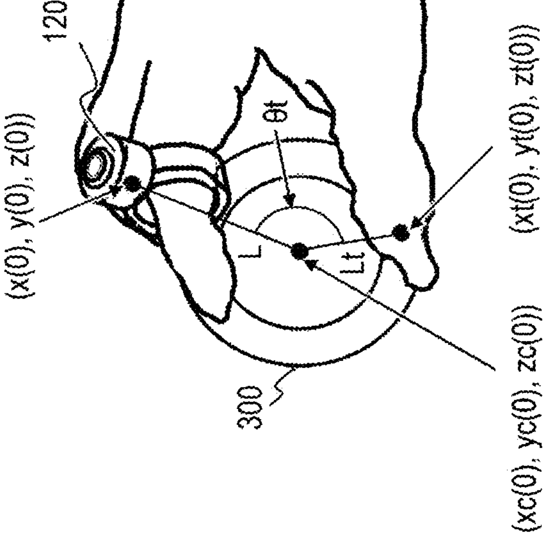
FIGS. 7A and 7B are diagrams for describing calculation of shift information according to the first embodiment.
Figure 7B:
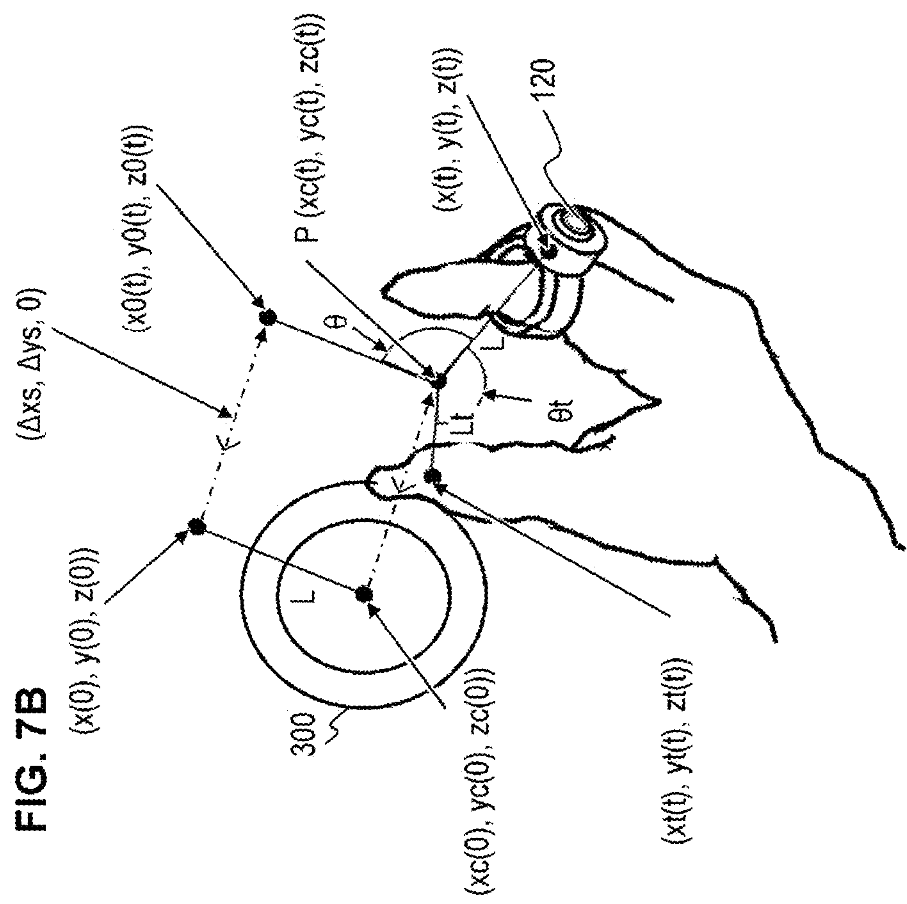

In step S507, the control unit 211 determines how far the position of the finger gripping the virtual dial 300 has shifted in a horizontal direction and a vertical direction, other than rotation centered on the center position of the virtual dial 300, as illustrated in FIG. 7B. In other words, the control unit 211 determines how much motion that the detected motion of the hand includes other than rotation of the hand. Specifically, the control unit 211 calculates (determines) movement information on the x-y plane corresponding to other than rotation of the hand, out of the movement information of the controller 120, as shift information (Δxs, Δys, 0).

The control unit 211 calculates the shift information (Δxs, Δys, 0) on the basis of the relation between the position of the controller 120 and the position of the virtual dial 300 at the point in time of step S504, in addition to the coordinates (x(t), y(t), z(t)) at the current position of the controller 120. Specifically, the control unit 211 calculates the shift information (Δxs, Δys, 0) in the x-axis direction and the y-axis direction using the distance L and the distance Lt found in step S504, in addition to the coordinates (x(t), y(t), z(t)) at the current position of the controller 120 (see FIG. 7B).

The control unit 211 determines a point P at a position that is the distance Lt away from the coordinates (xt(t), yt(t), zt(t)) of the current position of the thumb on the x-y plane, and that also is a position the distance L away from the coordinates (x(t), y(t), z(t)) on the x-y plane. Note that the point P is determined here such that a line segment connecting the coordinates (xc(t), yc(t), zc(t)) of the point P and the coordinates (xt(t), yt(t), zt(t)) of the position of the thumb, and a line segment connecting the coordinates of the point P and the coordinates (x(t), y(t), z(t)) of the current position of the controller 120 form the angle θt.

The control unit 211 then calculates the difference (difference of x-axis direction and y-axis direction) between the coordinates (xc(t), yc(t), zc(t)) of the point P and the coordinates (xc(0), yc(0), zc(0)) of the center position of the virtual dial 300, as in the following Expression 5. The control unit 211 sets (determines) the results of this calculation as the shift information (Δxs, Δys, 0).

[Math. 5]

$$(\Delta xs(t), \Delta ys(t), 0) = (xc(t)-xc(0), yc(t)-yc(0), 0) \tag{5}$$

In step S508, the control unit 211 corrects (sets again) the coordinates of the center position of the virtual dial 300 and the coordinates of the initial position of the controller 120. Specifically, the control unit 211 adds the shift information (Δxs, Δys, 0) to the coordinates (xc(0), yc(0), zc(0)) of the center position of the virtual dial 300 and the coordinates (x(0), y(0), z(0)) of the initial position of the controller 120, as in the following Expression 6. Hereinafter, the corrected coordinates of the center position of the virtual dial 300 will be expressed as coordinates (xc(t), yc(t), zc(t)), and the corrected coordinates of the initial position of the controller 120 will be expressed as coordinates (x0(t), y0(t), z0(t)). The corrected coordinates of the center position of the virtual dial 300 are the same as the coordinates of the point P described above. When a user operates a virtual operating interface, there are cases in which the position of the finger deviates from the position of the computer graphics of the virtual operating interface, but according to this arrangement, appropriate operations can be continued.

[Math. 6]

$$(xc(t), yc(t), zc(t)) = (xc(0) + \Delta xs(t), yc(0) + \Delta ys(t), zc(0)) \quad (6)$$
$$(x0(t), y0(t), z0(t)) = (x(0) + \Delta xs(t), y(0) + \Delta ys(t), z(0))$$

In step S509, the control unit 211 determines (detects), out of motion of the hand of the user, rotation of the hand on the x-y plane. Specifically, the control unit 211 determines an action angle θ(t) representing the rotational angle of the hand. In a case in which the processing of step S508 has been performed, for example, the action angle θ(t) can be determined as shown in Expression 7 below. Expression 7 uses the coordinates (x(t), y(t), z(t)) of the current position of the controller 120, the coordinates (xc(t), yc(t), zc(t)) of the center position of the virtual dial 300, and the coordinates (x0(t), y0(t), z0(t)) of the initial position of the controller 120.

[Math. 7]

$$\theta(t) = \cos^{-1}\frac{(x(t)-xc(t))(y(t)-yc(t))}{\sqrt{(x(t)-xc(t))^2+(y(t)-yc(t))^2}\sqrt{(x0(t)-xc(t))^2+(y0(t)-yc(t))^2}} \quad (7)$$

Note that in a case in which the processing of step S508 has not been performed, the control unit 211 uses the coordinates (xc(0), yc(0), zc(0)) of the center position of the virtual dial 300 instead of the coordinates (xc(t), yc(t), zc(t)). Also, in this case, the control unit 211 uses the coordinates (x(0), y(0), z(0)) of the initial position of the controller 120 instead of the coordinates (x0(t), y0(t), z0(t)).

In step S510, the control unit 211 operates the virtual dial 300 by the action angle θ(t). For example, the control unit 211 rotates the virtual dial 300 by the action angle θ(t). Accordingly, even when the way of holding the virtual dial 300 is different, the same results are obtained as long as the angle of rotating the hand is the same.

In step S511, the control unit 211 determines whether or not the finger has moved away from the virtual dial 300. Specifically, the control unit 211 determines whether or not the position of the finger is included in the operation accepting range 600, by the same method as in step S502. In a case of determining that the position of the finger is not included in the operation accepting range 600 (i.e., the finger has moved away from the virtual dial 300), the flow advances to step S512. In a case of determining that the position of the finger is included in the operation accepting range 600 (i.e., the finger has not moved away from the virtual dial 300), the flow returns to step S505.

In step S512, the control unit 211 ends display of the virtual dial 300. Thus, adjustment of the sound volume in accordance with rotation of the virtual dial 300 ends.

Operation of Virtual Slider

Figure 9:
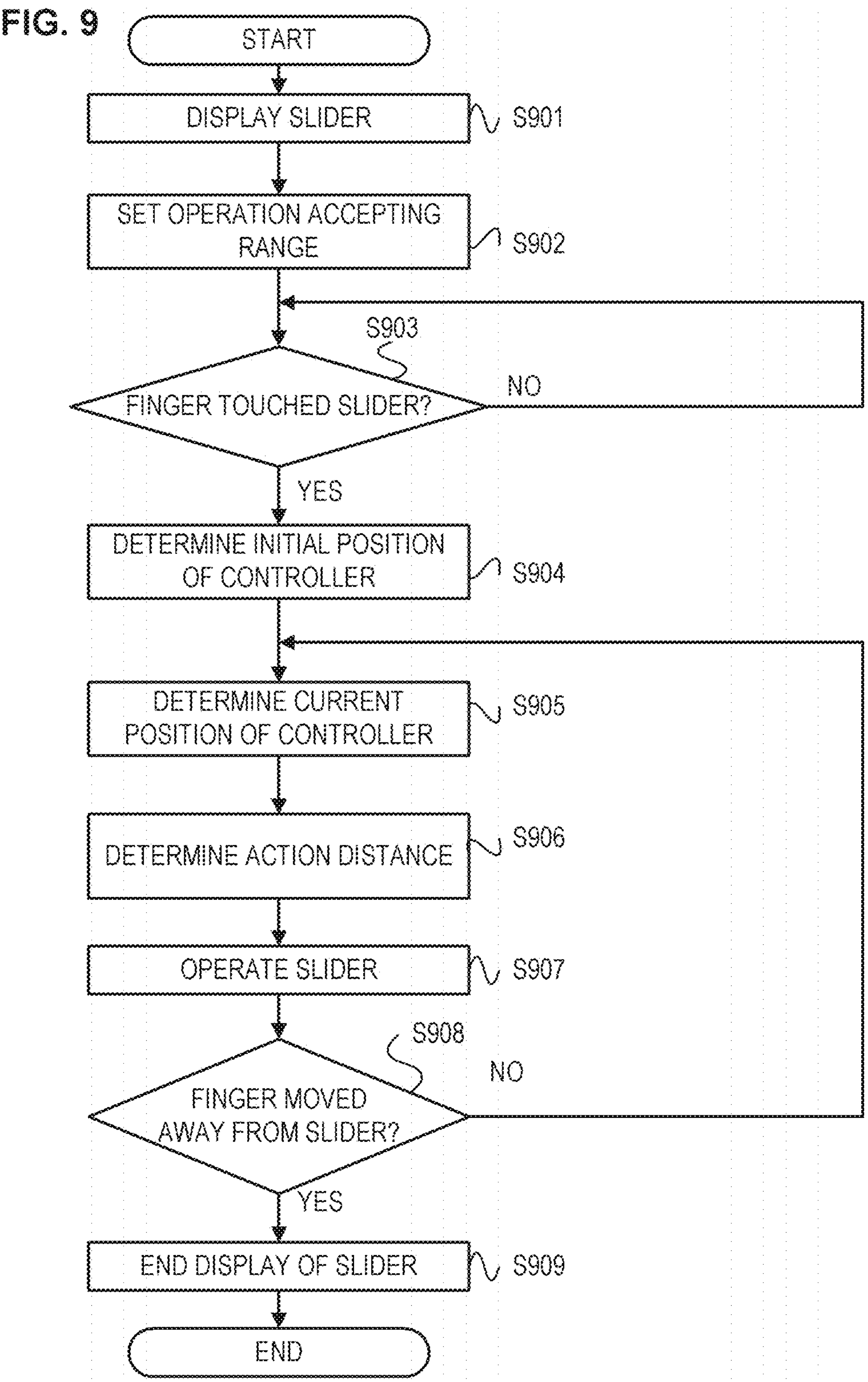
FIG. 9 is a flowchart of operation processing of the virtual slider according to the first embodiment.

An example of operations of the virtual slider 301 will be described with reference to the flowchart in FIG. 9. An example of the virtual slider 301 for sound volume adjustment illustrated in FIG. 3 will be described below. Note that the processing of the flowchart of FIG. 9 is started in a case in which the user selects an item for sound volume adjustment from a menu.

Figures 8A, 8B:
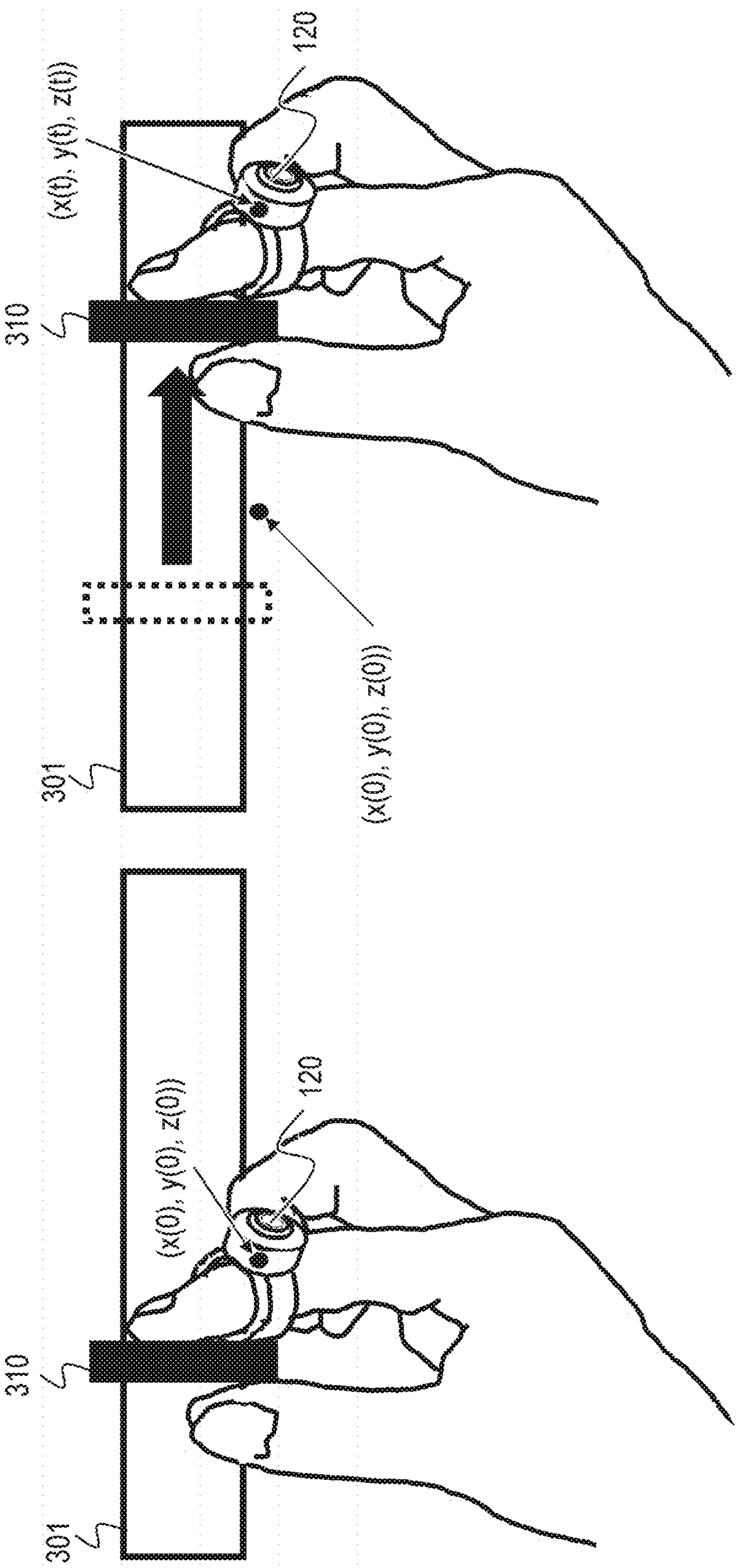
FIGS. 8A and 8B are diagrams for describing operation of a virtual slider according to the first embodiment.

In step S901, the control unit 211 displays the virtual slider 301 serving as the virtual operating interface on the image display unit 203, as illustrated in FIG. 8A. That is to say, the control unit 211 displays a composited image, representing virtual space in which the virtual slider 301 is placed in real space, on the image display unit 203.

In step S902, the control unit 211 determines the operation accepting range 600 of the virtual slider 301. The control unit 211 may control the size of the operation accepting range 600 in accordance with whether or not other virtual operating interfaces are present in the vicinity of the virtual slider 301, in the same way as with the case of the example of the virtual dial 300. That is to say, the control unit 211 may control the operation accepting ranges 600 of each of the plurality of virtual operating interfaces in accordance with the distance among the plurality of virtual operating interfaces in the virtual space (between the plurality of virtual interfaces).

In step S903, the control unit 211 determines, on the basis of the image-captured image, whether or not the finger (hand) of the user has touched the virtual slider 301, in the same way as in step S503. Whether or not the finger has touched the virtual slider 301 can be determined by the same method as the method of determining whether or not the finger has touched the virtual dial 300. In a case in which determination is made that the finger has touched the virtual slider 301, the flow advances to step S904. In a case in which determination is made that the finger has not touched the virtual slider 301, the processing of step S903 is repeated.

In step S904, the control unit 211 determines the coordinates (x(0), y(0), z(0)) of the initial position of the controller 120 (the finger on which the controller 120 is mounted), on the basis of the image-captured image, as illustrated in FIG. 8A.

In step S905, the control unit 211 determines the current position of the controller 120 (the finger on which the controller 120 is mounted). The control unit 211 determines the coordinates (x(t), y(t), z(t)) of the current position of the controller 120 on the basis of the acceleration information (ax(t), ay(t), az(t)) acquired by the detecting unit 222 (see FIG. 8B). Note that in a case in which the image-capturing unit 202 is performing image-capturing of the finger, the control unit 211 may determine, in addition to the acceleration information, the coordinates (x(t), y(t), z(t)) of the current position of the controller 120, on the basis of the coordinates (h, v) of the position of the finger obtained from the image-captured image.

First, the control unit 211 controls the detecting unit 222 to determine (detect) motion of the hand. Specifically, the detecting unit 222 calculates movement information (Δx(t), Δy(t), Δz(t)) from the coordinates (x(0), y(0), z(0)) of the initial position, as information representing motion of the hand. In order to calculate the movement information (Δx(t), Δy(t), Δz(t)), the detecting unit 222 performs double integration of the detected acceleration. The detecting unit 222 calculates the movement information Δx of movement in the x-axis direction from time t=0 to time t=T, using acceleration ax(t) in the x-axis direction for example, as shown in Expression 8 below. Note that calculation such as shown in Expression 8 is performed regarding each of the x-axis direction, the y-axis direction, and the z-axis direction.

[Math. 8]

$$\Delta x(t)=\sum_{t=0}^{T}\sum_{t=0}^{T}ax(t)dtdt \tag{8}$$

The control unit 211 then determines coordinates obtained by adding the movement information (Δx(t), Δy(t), Δz(t)) to the coordinates (x(0), y(0), z(0)) of the initial position to be the coordinates (x(t), y(t), z(t)) of the current position of the controller 120.

In step S906, the control unit 211 determines an action distance L(t) that represents the amount of motion of the hand on the x-y plane, as shown in Expression 9 below. Expression 9 uses the coordinates (x(t), y(t), z(t)) of the current position of the controller 120 and the initial position (x(0), y(0), z(0)) of the controller 120.

[Math. 9]

$$L(t)=\sqrt{(x(t)-x(0))^2+(y(t)-y(0))^2} \tag{9}$$

In step S907, the control unit 211 operates the virtual slider 301 by the action distance L(t). For example, the control unit 211 moves a bar 310 by the action distance L(t), as illustrated in FIGS. 8A and 8B.

In step S908, the control unit 211 determines whether or not the finger has moved away from the virtual slider 301. Specifically, the control unit 211 determines whether or not the position of the finger is included in the operation accepting range 600. In a case of determining that the position of the finger is not included in the operation accepting range 600, the flow advances to step S909. In a case of determining that the position of the finger is included in the operation accepting range 600, the flow returns to step S905.

In step S909, the control unit 211 ends display of the virtual slider 301.

In the above, situations in which the image-capturing unit 202 is used without fail is only in a case of detecting contact with the virtual operating interface, and the virtual operating interface can be operated in the subsequent processing using the detecting unit 222 along, without using the image-capturing unit 202. Accordingly, even in a case in which the hand of the user cannot be detected from the image-captured image after detecting contact, operation of the virtual operating interface can be continued using inertial information acquired from the detecting unit 222. Note that a case in which the hand of the user cannot be detected from the image-captured image is a case in which the hand of the user can no longer be detected due to the hand exiting from the image-capturing range of the image-capturing unit 202, a case in which the finger of the user is hidden by the back of the hand or the like inside the image-captured image and can no longer be detected, and so forth.

Figure 10:
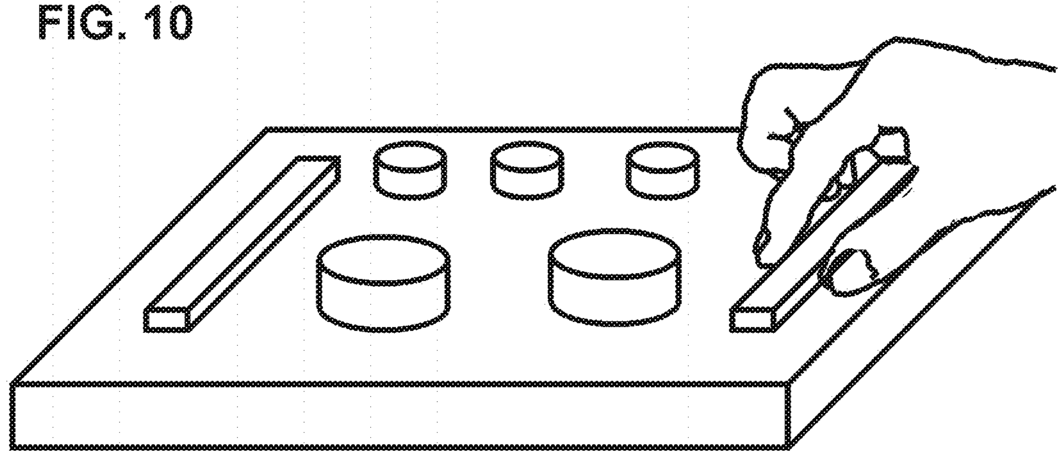
FIG. 10 is a diagram illustrating an interface using a model according to the first embodiment.

Also, an arrangement may be made in which a model is created that mimics an operating member (dial, slider, etc.) that does not communicate with the HMD, this model is recognized, and computer graphics are overlaid on the model so as to be used as an operating interface. In this case, the operating interface can be used as an operating member that can be physically operated, as illustrated in FIG. 10.

Second Embodiment

An operating method of a virtual operating interface according to a second embodiment will be described below with reference to FIG. 11. Only portions that are different from the first embodiment will be described below.

In the second embodiment, the flow of operation of the virtual dial 300 differs from that in the first embodiment, and accordingly the flow of operation of the virtual dial 300 will be described with reference to the flowchart in FIG. 11.

In steps S1101 to S1103, processing the same as in steps S501 to S503 shown in FIG. 5 is performed.

In step S1104, the control unit 211 determines whether or not the size of the virtual dial 300 is no less than a predetermined size. In a case in which determination is made that the size of the virtual dial 300 is no less than the predetermined size, the flow advances to step S1105. In a case in which determination is made that the size of the virtual dial 300 is less than the predetermined size, the flow advances to step S504, and thereafter processing of the flowchart shown in FIG. 5 is performed.

In step S1105, the control unit 211 determines whether or not the fingertip of the index finger has been detected from the image-captured image. In a case in which determination is made that the fingertip of the index finger has been detected, the flow advances to step S1106. In a case in which determination is made that the fingertip of the index finger has not been detected, the flow advances to step S504, and thereafter processing of the flowchart shown in FIG. 5 is performed. Note that determination may be made regarding whether or not the controller 120 has been detected in the image-captured image, rather than the fingertip of the index finger.

In step S1106, the control unit 211 determines the initial position of the controller 120 (the index finger on which the controller 120 is mounted). Specifically, the control unit 211 determines the coordinates (x(0), y(0), z(0)) of the initial position of the controller 120, on the basis of the image-captured image acquired from the image-capturing unit 202. The control unit 211 also determines the coordinates (xt(0), yt(0), zt(0)) of the initial position of the thumb, on the basis of the image-captured image.

Further, the control unit 211 calculates the distance L between the center position of the virtual dial 300 and the controller 120 on the x-y plane, by the above Expression 1, in the same way as in step S504. The control unit 211 calculates the distance Lt between the thumb and the center position of the virtual dial 300 on the x-y plane, by the above Expression 2. The control unit 211 then calculates the angle θt formed between a line segment connecting the center position of the virtual dial 300 and the position of the thumb, and a line segment connecting the position of the controller 120 and the center position of the virtual dial 300, by the above Expression 3.

In step S1107, the control unit 211 determines the coordinates (x(t), y(t), z(t)) of the current position of the controller 120 (index finger on which the controller 120 is mounted). Here, the control unit 211 determines the coordinates (x(t), y(t), z(t)) of the current position of the controller 120 by conversion of the coordinates (h(t), v(t)) of the position of the controller 120 in the image-captured image acquired from the image-capturing unit 202.

In steps S1108 to S1113, processing the same as in steps S507 to S512 shown in FIG. 5 is performed.

In this way, in a case in which the virtual dial 300 is large, the control unit 211 determines the position of the controller 120 (finger on which the controller 120 is mounted) from the image-captured image (image-capturing results from the image-capturing unit 202) alone. Thus, the load necessary for processing can be reduced. Note that in a case in which the virtual dial 300 is large, the motion of the hand becomes large, and accordingly there is a high probability of being able to accurately determine the motion of the hand from the image-captured image alone. Thus, the virtual operating interface can be appropriately operated without using inertial information of the controller 120.

Third Embodiment

Figure 12B:
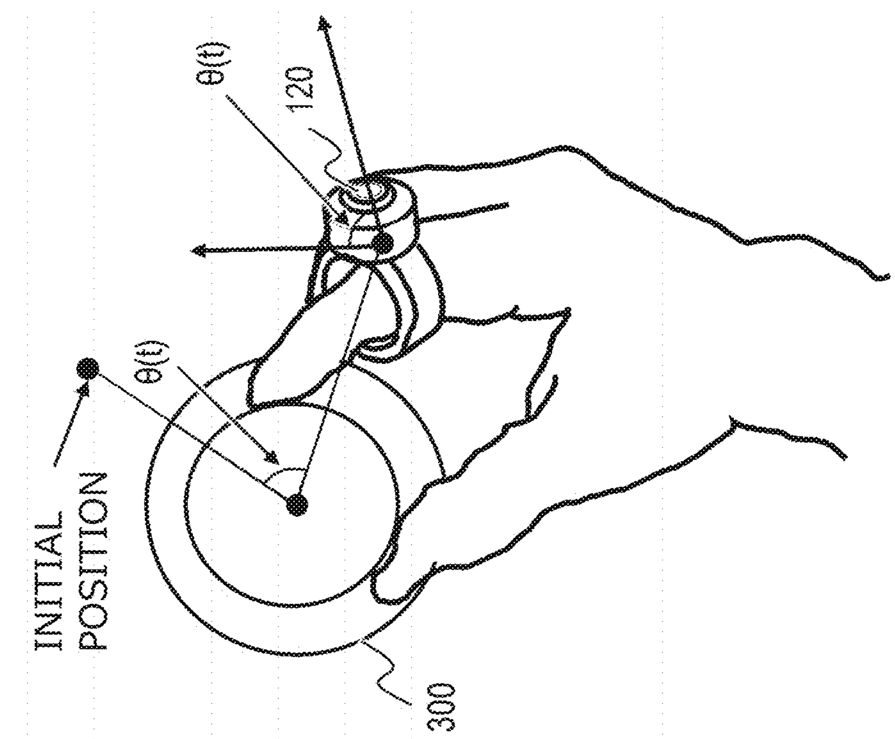
FIGS. 12A and 12B are diagrams for describing operation of a virtual dial according to a third embodiment.
Figure 12A:
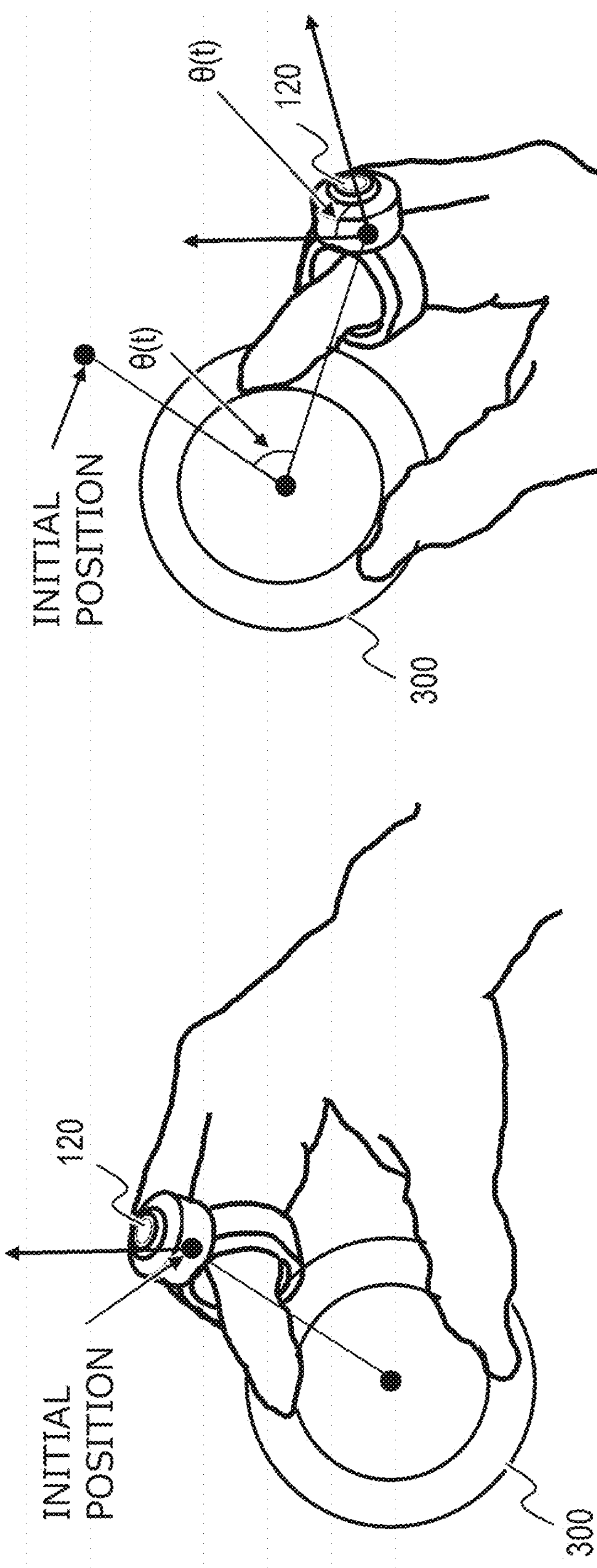
Figure 13:
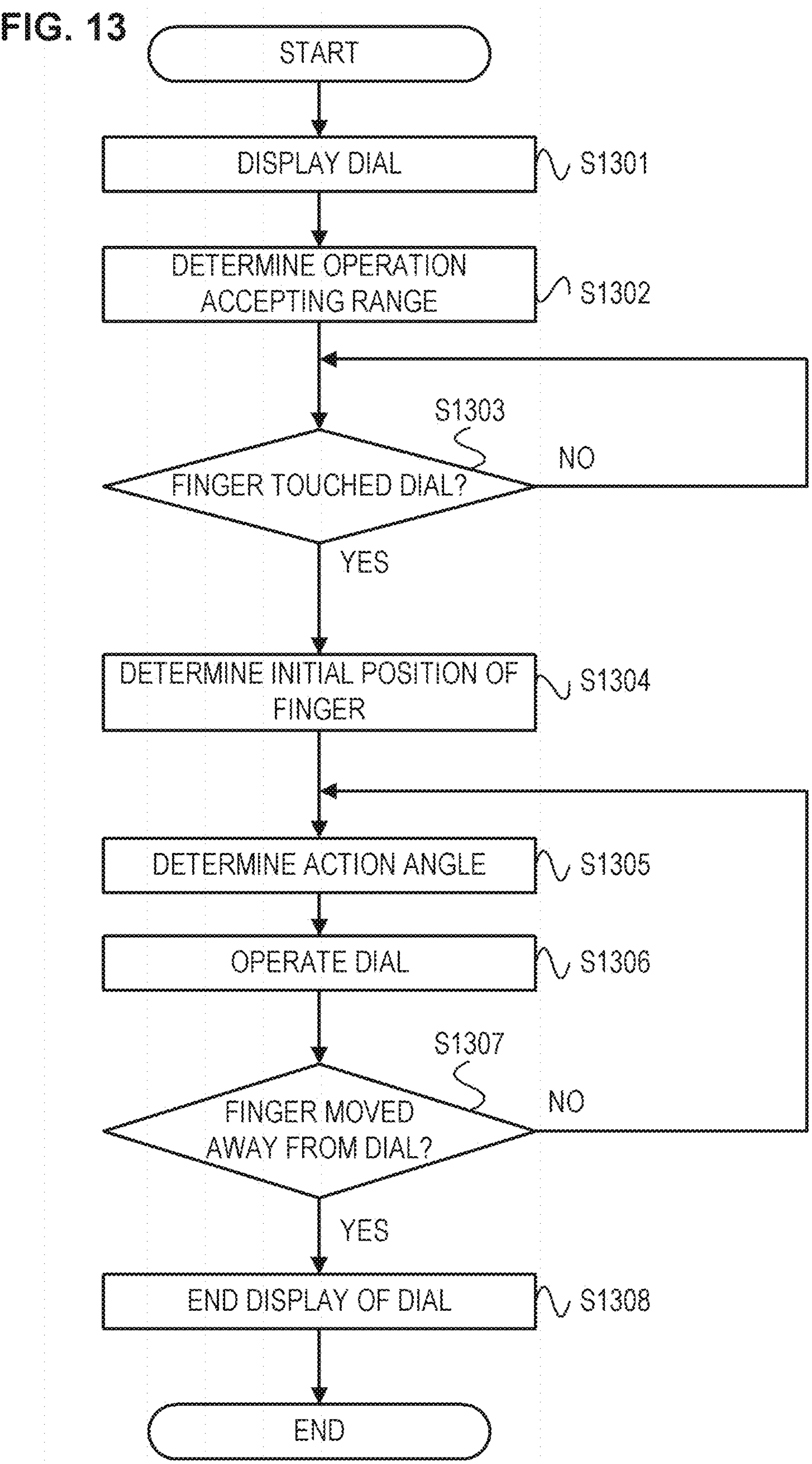
FIG. 13 is a flowchart of operation processing of a virtual dial according to the third embodiment.

An operating method of a virtual operating interface according to a third embodiment will be described below with reference to FIGS. 12A to 13. Only portions that are different from the first embodiment will be described below.

In the third embodiment, the flow of operation of the virtual dial 300 differs from that in the first embodiment, and accordingly the flow of operation of the virtual dial 300 will be described with reference to the flowchart in FIG. 13. As illustrated in FIGS. 12A and 12B, the action angle θ(t) is the same value as the rotational angle of the controller 120. Accordingly, in the third embodiment, the control unit 211 calculates the action angle θ(t) on the basis of angular velocity information measured by a gyro sensor included in the detecting unit 222.

In steps S1301 to S1304, processing the same as in steps S501 to S504 shown in FIG. 5 is performed.

In step S1305, the control unit 211 determines (detects) rotation of the hand on the x-y plane, out of the motion of the hand of the user. Specifically, the control unit 211 controls the detecting unit 222 to calculate (detect) the action angle θ(t) of the controller 120 (finger on which the controller 120 is mounted), as illustrated in FIG. 12B. The detecting unit 222 uses the acquired angular velocity information (rx, ry, rz) to calculate the action angle θ(t). Specifically, the detecting unit 222 calculates a rotational angle θz(t) that represents the rotation of the hand by performing integration of the angular velocity just once. The control unit 211 calculates the rotational angle θz(t) in the z-axis direction from time t=0 to time t=T using angular velocity rz(t) in the z-axis direction by the following Expression 10, for example.

[Math. 10]

$$\theta z(t) = \sum_{t=0}^{T} rz(t)dt \tag{10}$$

In this way, Expression 10 is performed with regard to the z-axis direction. The action angle θ(t) that is the rotation angle on the x-y plane is a rotational angle in the z-axis direction, and accordingly θ(t)=θz(t).

In step S1306, the control unit 211 operates the virtual dial 300 by the action angle θ(t).

In step S1307, the control unit 211 determines whether or not the finger has moved away from the virtual dial 300, in the same way as in step S511. That is to say, the control unit 211 determines whether or not the position of the finger is included in the operation accepting range 600. In a case of determining that the position of the finger is not included in the operation accepting range 600, the flow advances to step S1308. In a case of determining that the position of the finger is included in the operation accepting range 600, the flow returns to step S1305.

In step S1308, the control unit 211 ends display of the virtual dial 300. Thus, adjustment of sound volume ends.

According to the third embodiment, the number of processing steps for calculating the action angle θ(t) can be reduced as compared to the first embodiment. Thus, the time from the user moving his/her finger until that motion being reflected in operation of the virtual dial 300 can be shortened.

According to the present invention, motion of the hand can be detected and the virtual interface appropriately operated.

Also, in the above, "in a case in which A is no less than B, the flow advances to step S1, and in a case in which A is smaller than (lower than) B, the flow advances to step S2" may be reread as "in a case in which A greater (higher) than B, the flow advances to step S1, and in a case in which A is not more than B, the flow advances to step S2". Conversely, "in a case in which A greater (higher) than B, the flow advances to step S1, and in a case in which A is not more than B, the flow advances to step S2" may be reread as "in a case in which A is no less than B, the flow advances to step S1, and in a case in which A is smaller than (lower than) B, the flow advances to step S2". Accordingly, to the extent that no contradiction arises, the expression "no less than A" may be substituted with "A or greater (higher, longer, more) than A", and may be reread as "greater (higher, longer, more) than A" and thus substituted. Conversely, the expression "not more than A" may be substituted with "A or smaller (lower, shorter, less) than A", and may be substituted with "smaller (lower, shorter, less) than A" and thus reread. Also, "greater (higher, longer, more) than A" may be reread as "no less than A", and "smaller (lower, shorter, less) than A" may be reread as "not more than A".

Although the present invention has been described in detail above by way of preferred embodiments, the present invention is not limited to these particular embodiments, and various forms made without departing from the spirit and scope of the invention are encompassed by the present invention. Part of the above-described embodiments may be combined as appropriate.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-163334, filed on Oct. 11, 2022, which is hereby incorporated by reference herein in its entirety.

What is claimed is:

1. An information processing system comprising at least one memory and at least one processor which function as:

a determining unit configured to determine motion of a hand of a user on a basis of inertial information of a controller held in or mounted on the hand;

a control unit configured to control a display unit to display a virtual space in which a virtual interface is placed in a real space; wherein in a case in which a position of the virtual interface and a position of the hand in the virtual space are in a particular relation in which the position of the hand is included in an operation accepting range that includes the position of the virtual interface, the control unit changes the display of the virtual interface on a basis of the motion of the hand determined by the determining unit, and wherein in a case of placing a plurality of virtual interfaces in the real space, the control unit controls a size of the operation accepting range on a basis of a distance among the plurality of virtual interfaces.

2. The information processing system according to claim 1, wherein the determining unit determines the motion of the hand from an initial position on the basis of the inertial information, and the initial position is a position of the hand at a particular point in time in which the position of the virtual interface and the position of the hand are in the particular relation.

3. The information processing system according to claim 1, wherein the determining unit determines the motion of the hand on the basis of the inertial information and not on the basis of the image-captured image in which the hand of the user is image-captured.

4. The information processing system according to claim 1, wherein the inertial information is acceleration information or angular velocity information.

5. The information processing system according to claim 4, wherein the inertial information is the acceleration information, and the determining unit determines movement information of the controller that represents the motion of the hand, on a basis of the acceleration information.

6. The information processing system according to claim 5, wherein the virtual interface is a dial of which display is changeable in accordance with rotation of the hand on a particular plane, the determining unit determines the rotation of the hand, out of the motion of the hand, on a basis of the movement information of the controller, and in a case in which the position of the dial and the position of the hand are in the particular relation, the control unit updates the display of the dial on a basis of the rotation of the hand determined by the determining unit.

7. The information processing system according to claim 6, wherein the determining unit determines shift information that is movement information corresponding to the movement of the hand on the particular plane, other than rotation of the hand, out of the movement information of the controller, on a basis of a relation among the position of the dial, the position of the controller, and a position of a particular finger of the user, and determines the rotation of the hand on a basis of the movement information of the controller and the shift information.

8. The information processing system according to claim 6, wherein, in a case of updating the display of the dial on a basis of the motion of the hand, the control unit corrects the position of the dial on the basis of the movement information of the controller.

9. The information processing system according to claim 1, wherein, in a case in which a size of the virtual interface is larger than a predetermined size, the determining unit determines the motion of the hand on the basis of the image-captured image in which the hand of the user is image-captured.

10. The information processing system according to claim 1, wherein the controller has at least one of an acceleration sensor and a gyro sensor as a sensor for acquiring the inertial information.

11. An information processing method, comprising:

determining motion of a hand of a user on a basis of inertial information of a controller held in or mounted on the hand; and controlling a display unit to display a virtual space in which a virtual interface is placed in a real space, wherein in a case in which it is determined that a position of the virtual interface and a position of the hand in the virtual space are in a particular relation in which the position of the hand is included in an operation accepting range that includes the position of the virtual interface, the display of the virtual interface is changed on a basis of the motion of the hand determined, and wherein in a case of placing a plurality of virtual interfaces in the real space, a size of the operation accepting range is controlled on a basis of a distance among the plurality of virtual interfaces.

12. A non-transitory computer readable medium that stores a program, wherein the program causes a computer to execute an information processing method, the information processing method including determining motion of a hand of a user on a basis of inertial information of a controller held in or mounted on the hand; and controlling a display unit to display a virtual space in which a virtual interface is placed in a real space, wherein in a case in which it is determined that a position of the virtual interface and a position of the hand in the virtual space are in a particular relation in which the position of the hand is included in an operation accepting range that includes the position of the virtual interface, the display of the virtual interface is changed on a basis of the motion of the hand determined, and wherein in a case of placing a plurality of virtual interfaces in the real space, a size of the operation accepting range is controlled on a basis of a distance among the plurality of virtual interfaces.

* * * * *